(12) United States Patent
Song et al.

(10) Patent No.: US 12,293,434 B2
(45) Date of Patent: May 6, 2025

(54) IMAGE GENERATION METHOD AND APPARATUS

(71) Applicant: TENCENT TECHNOLOGY (SHENZHEN) COMPANY LIMITED, Guangdong (CN)

(72) Inventors: Yibing Song, Guangdong (CN); Chongjian Ge, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 303 days.

(21) Appl. No.: 17/948,637

(22) Filed: Sep. 20, 2022

(65) Prior Publication Data

US 2023/0017112 A1    Jan. 19, 2023

Related U.S. Application Data

(63) Continuation of application No. PCT/CN2022/073394, filed on Jan. 24, 2022.

(30) Foreign Application Priority Data

Jan. 28, 2021 (CN) .......................... 202110118922.2

(51) Int. Cl.
*G06V 40/10* (2022.01)
*G06T 11/00* (2006.01)
(Continued)

(52) U.S. Cl.
CPC ............ *G06T 11/00* (2013.01); *G06V 10/443* (2022.01); *G06V 10/467* (2022.01); *G06V 40/10* (2022.01); *G06T 2210/16* (2013.01)

(58) Field of Classification Search
None
See application file for complete search history.

(56) References Cited

U.S. PATENT DOCUMENTS

2006/0202986 A1    9/2006   Okada et al.

FOREIGN PATENT DOCUMENTS

| CN | 111339918 A | 6/2020 |
|----|-------------|--------|
| CN | 111420399   | 7/2020 |

(Continued)

OTHER PUBLICATIONS

Han et al., "ClothFlow: A Flow-Based Model for Clothed Person Generation", IEEE, 2019 (Year: 2019).*

(Continued)

*Primary Examiner* — Nicholas R Wilson
(74) *Attorney, Agent, or Firm* — Crowell & Moring LLP

(57) ABSTRACT

This disclosure is related to an image generation method and apparatus. The method includes: obtaining a first body image including a target body and a first clothes image including target clothes; transforming the first clothes image based on a posture of the target body in the first body image to obtain a second clothes image, the second clothes image including the target clothes, and a posture of the target clothes matching the posture of the target body; performing feature extraction on the second clothes image, an image of a bare area in the first body image, and the first body image to obtain a clothes feature, a skin feature, and a body feature respectively; and generating a second body image based on the clothes feature, the skin feature, and the body feature, the target body in the second body image wearing the target clothes.

20 Claims, 8 Drawing Sheets

(51) Int. Cl.
*G06V 10/44* (2022.01)
*G06V 10/46* (2022.01)

(56) References Cited

FOREIGN PATENT DOCUMENTS

| | | |
|---|---|---|
| CN | 111709874 A | 9/2020 |
| CN | 111768507 | 10/2020 |
| CN | 112991494 | 6/2021 |
| WO | 2020/171237 | 12/2021 |

OTHER PUBLICATIONS

International Search Report issued Mar. 30, 2022 in International (PCT) Application No. PCT/CN2022/073394.
Sun et al., "Image-based virtual try-on network with structural coherence," IEEE International Conference on Image Processing, Sep. 2019, 519-523.
Han et al., "An image-based virtual try-on network," IEEE Conference on Computer Vision and Pattern Recognition, Jun. 2018, 7543-7552.
Yang et al., "Towards photo-realistic virtual try-on by adaptively generating preserving image content," arXiv, Mar. 2020, 13 pages.
Extended European Search Report in European Application No. 22745176.2, dated Apr. 18, 2024, 11 pages.

* cited by examiner

IMAGE GENERATION METHOD AND APPARATUS

RELATED APPLICATION

This application is a continuation application of PCT Patent Application No. PCT/CN2022/073394, filed on Jan. 24, 2022, which claims priority to Chinese Patent Application No. 202110118922.2, entitled "IMAGE GENERATION METHOD AND APPARATUS, COMPUTER DEVICE, AND COMPUTER-READABLE STORAGE MEDIUM" and filed with the China National Intellectual Property Administration on Jan. 28, 2021, wherein the content of each of the above-referenced disclosures is incorporated herein by reference in its entirety.

FIELD OF THE TECHNOLOGY

This disclosure relates to the field of image processing technologies, and in particular, to an image generation method and apparatus, a computer device, a computer-readable storage medium, and a computer program product.

BACKGROUND OF THE DISCLOSURE

Virtual dressing is to perform fusion on a body image of a user and a clothes image including target clothes by using an image fusion technology, to obtain an image in which the user wears the target clothes, so that the user can learn of a wearing effect of the target clothes without actually trying on the target clothes.

Currently, in a virtual dressing process, feature extraction is usually performed on the body image and the clothes image separately by using an image fusion model, and a new image, namely, the image in which the user wears the target clothes, is generated based on two extracted image features. However, in the foregoing process, because rough image features are extracted by using the image fusion model, the newly generated image is likely to lack detailed information when the image is generated, which leads to distortion of an image generation effect and results in a poor virtual dressing effect.

SUMMARY

Embodiments of this disclosure provide an image generation method and apparatus, a computer device, a computer-readable storage medium, and a computer program product.

An image processing method, performed by a computer device, the method including:
  obtaining a first body image including a target body and a first clothes image including target clothes;
  transforming the first clothes image based on a posture of the target body in the first body image to obtain a second clothes image, the second clothes image including the target clothes, and a posture of the target clothes matching the posture of the target body;
  performing feature extraction on the second clothes image, an image of a bare area in the first body image, and the first body image to obtain a clothes feature, a skin feature, and a body feature respectively, the bare area being an area, of the target body in the first body image, that is not covered by clothes; and
  generating a second body image based on the clothes feature, the skin feature, and the body feature, the target body in the second body image wearing the target clothes.

An image generation apparatus, the apparatus including a memory operable to store computer-readable instructions and a processor circuitry operable to read the computer-readable instructions. When executing the computer-readable instructions, the processor circuitry is configured to:
  obtain a first body image comprising a target body and a first clothes image comprising target clothes;
  transform the first clothes image based on a posture of the target body in the first body image to obtain a second clothes image, the second clothes image comprising the target clothes, and a posture of the target clothes matching the posture of the target body;
  perform feature extraction on the second clothes image, an image of a bare area in the first body image, and the first body image to obtain a clothes feature, a skin feature, and a body feature respectively, the bare area being an area, of the target body in the first body image, that is not covered by clothes; and
  generate a second body image based on the clothes feature, the skin feature, and the body feature, the target body in the second body image wearing the target clothes.

A non-transitory machine-readable media is provided, storing computer-readable instructions. When being executed, the instructions is configured to cause the machine to:
  obtain a first body image comprising a target body and a first clothes image comprising target clothes;
  transform the first clothes image based on a posture of the target body in the first body image to obtain a second clothes image, the second clothes image comprising the target clothes, and a posture of the target clothes matching the posture of the target body;
  perform feature extraction on the second clothes image, an image of a bare area in the first body image, and the first body image to obtain a clothes feature, a skin feature, and a body feature respectively, the bare area being an area, of the target body in the first body image, that is not covered by clothes; and
  generate a second body image based on the clothes feature, the skin feature, and the body feature, the target body in the second body image wearing the target clothes.

Details of one or more embodiments of this disclosure are provided in the accompany drawings and descriptions below. Other features, objectives, and advantages of this disclosure are illustrated in the specification, the accompanying drawings, and the claims.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

To make the objectives, technical solutions, and advantages of this disclosure clearer, the following further describes implementations of this disclosure in detail with reference to the accompanying drawings. Evidently, the described embodiments are a part rather than all the embodiments of this disclosure. Based on the embodiments of this disclosure, all other embodiments obtained by a person of ordinary skill in the art without creative efforts shall fall within the protection scope of this disclosure.

The terms "first", "second", and the like in this disclosure are used for distinguishing between same items or similar items of which effects and functions are basically the same. It should be understood that, the "first", "second", and "nth" do not have a dependency relationship in logic or time sequence, and a quantity and an execution order thereof are not limited.

The artificial intelligence (AI) technology is a comprehensive subject, relating to a wide range of fields, and involving both hardware and software techniques. Basic AI technologies generally comprise technologies such as a sensor, a dedicated AI chip, cloud computing, distributed storage, a big data processing technology, an operating/interaction system, and electromechanical integration. AI software technologies mainly include fields such as a computer vision technology, a speech processing technology, a natural language processing technology, machine learning/deep learning, and the like. Embodiments of this disclosure relate to computer vision (CV) technologies of AI.

Terms involved in this disclosure are explained below:

Spatial transformer network (STN): an operation network that can spatially transform data, such as feature images, in a network without introducing additional data labels.

Thin plate spline (TPS): an interpolation algorithm that can be used in tasks, such as image warping, to drive, by using a few control points, an image to change.

Generator: a network built based on a deep neural network and configured to generate an image, which is usually in an encoder-decoder structure, namely, a downsampling-upsampling structure.

Body semantic information: In the embodiments of this disclosure, the body semantic information is information obtained by representing each body part of a body by using different pixel values.

Figure 1:
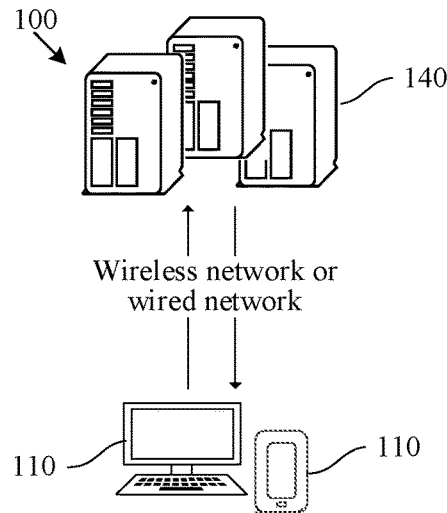
FIG. 1 is a schematic diagram of an implementation environment of an image generation method according to an embodiment of this disclosure.

FIG. 1 is a schematic diagram of an implementation environment 100 of an image generation method according to an embodiment of this disclosure. As shown in FIG. 1, the implementation environment 100 includes a terminal 110 and a server 140.

An application program that supports image generation is installed and run on the terminal 110. For example, the application program is a virtual dressing application program or an e-commerce application program. The application program can call an image generation function to perform fusion on a body image of a user and an image of target clothes to generate a new body image. The new body image can present an effect of wearing the target clothes by the user. In some embodiments, the terminal 110 may be a smartphone, a tablet computer, a notebook computer, a desktop computer, an Internet of Things device, or a portable wearable device. The Internet of Things device may be a smart television, a smart speaker, a smart air conditioner, a smart in-vehicle device, or the like. The portable wearable device may be a smart watch, a smart band, a head-mounted device, or the like. In some embodiments, the terminal 110 is a smart household. For example, the terminal 110 is a smart mirror or a smart wardrobe. A device type of the terminal 110 is not limited in this embodiment of this disclosure. For example, the terminal 110 is a terminal used by a user, and the application program running on the terminal 110 logs in to a user account. The terminal 110 may generally refer to one of a plurality of terminals. In this embodiment, the terminal 110 is merely used as an example for description.

The server 140 may include at least one of one server, a plurality of servers, a cloud computing platform, and a virtualization center. The server 140 is configured to provide a background service to the application. In some embodiments, the server 140 is responsible for primary work for generating an image, and the terminal 110 is responsible for secondary work for generating the image; or the server 140 is responsible for secondary work for generating an image, and the terminal 110 is responsible for primary work for generating the image; or the server 140 and the terminal 110 are separately responsible for work for generating an image independently.

In some embodiments, the server 140 includes: an access server, an image generation server, and a database. The access server is configured to provide an access service for the terminal 110. The image generation server is configured to provide a background service related to image generation. The image generation server may be equipped with a graphics processing unit and support multi-thread parallel computation of the graphics processing unit. There may be one or more image generation servers. When there is a plurality of image generation servers, at least two image generation servers are configured to provide different services, and/or at least two image generation servers are configured to provide the same service, for example, provide the same service in a load balancing manner. This is not limited in this embodiment of this disclosure. An image fusion model may be set on the image generation server. During model training and application, the image generation server may be equipped with a graphics processing unit (GPU) and support parallel operations of the graphics processing unit. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 and the image generation platform 140 may be directly or indirectly connected in a wired or wireless communication manner. This is not limited in this embodiment of this disclosure.

In some embodiments, the implementation environment may be deployed in a blockchain system. For example, the server is a node device in a blockchain, and the server is equipped with an image generation model. In response to a virtual dressing event, the terminal transmits a virtual dressing instruction to the server in the blockchain system. The virtual dressing event may be a virtual dressing operation triggered by a user through interaction with the terminal, or may be an event automatically triggered when the terminal detects, by using a detection device, that a trigger condition is met. The virtual dressing instruction carries a private key signature of the user. The server performs verification on the virtual dressing instruction by using a public key of the user. In response to successful verification, the image generation model on the server performs a virtual dressing task based on the virtual dressing instruction. The terminal may also be a node device in the blockchain system. This is not limited in this embodiment of this disclosure.

The image generation method provided in the embodiments of this disclosure can be combined with a variety of application scenarios. For example, in an e-commerce application program, in a case that a user needs to try on clothes displayed in the application program, a computer device may call the image generation function to generate a new body image based on a body image of the user and a clothes image of the clothes to be tried on. The new body image can present an effect of wearing, by the user, the clothes to be tried on. Certainly, the image generation method provided in the embodiments of this disclosure may be alternatively applied to a smart household, for example, a smart mirror or a smart wardrobe. An application scenario of the image generation method is not limited in the embodiments of this disclosure.

Specifically, the computer device transforms an original first clothes image based on a posture of a target body to obtain a second clothes image that fits the posture of the target body and that preserves a large amount of detailed information; and then performs feature extraction on the second clothes image and a first body image in different dimensions based on different extraction tasks to obtain a clothes feature, a skin feature, and a body feature, that is, to obtain three more fine-grained and more accurate features in different dimensions, so that a second body image generated based on these features can include more abundant detailed information, the second body image has high authenticity, and a good virtual dressing effect is ensured.

Figure 2:
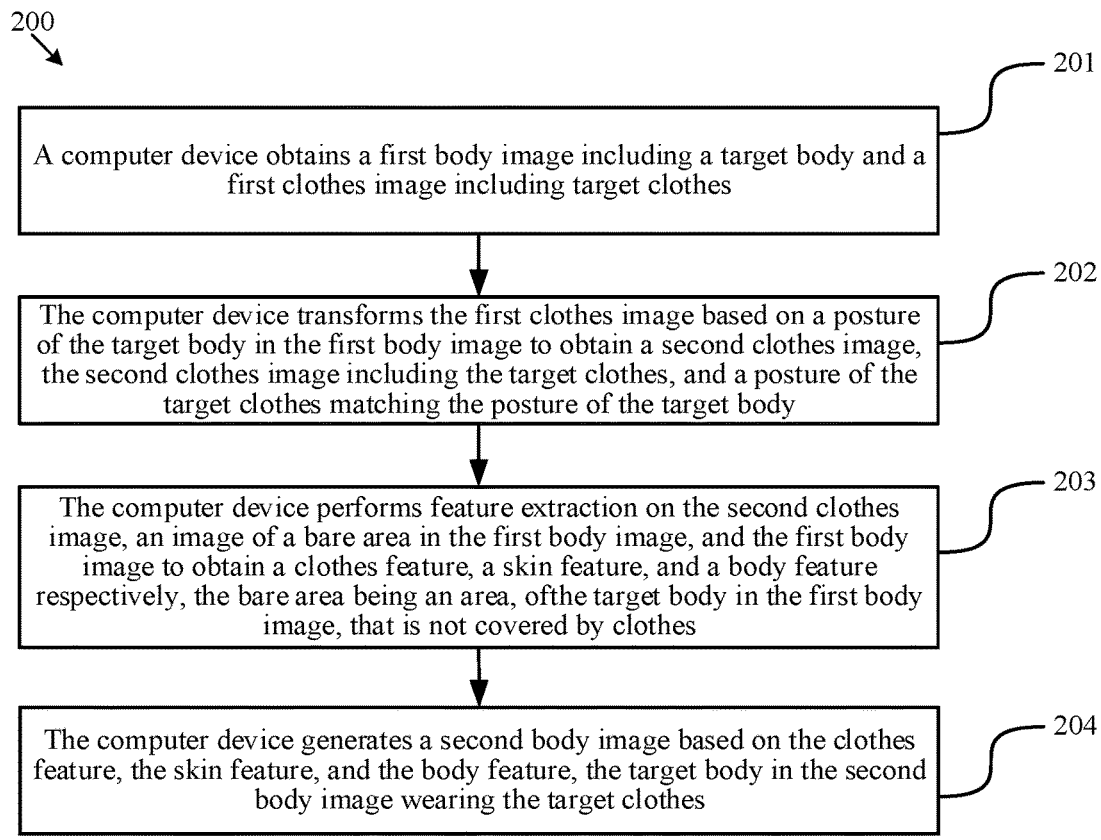
FIG. 2 is a flowchart of an image generation method according to an embodiment of this disclosure.

FIG. 2 is a flowchart of an image generation method 200 according to an embodiment of this disclosure. The method 200 may be applied to the foregoing terminal or server, and both the terminal and the server may be considered as computer devices. Therefore, this embodiment of this disclosure is described based on a computer device as an execution body. Referring to FIG. 2, this embodiment may specifically include the following steps:

201: A computer device obtains a first body image including a target body and a first clothes image including target clothes.

The first body image may be a whole-body image or a half-body image of the target body. A part of the body on which the first clothes image is put on matches a body area displayed in the first body image of the target body. For example, the first body image is an upper-body image of the target body, and the first clothes image is an image corresponding to clothes on an upper body, for example, an image of a jacket. For another example, the first body image is a lower-body image of the target body, and the first clothes image is an image of clothes on a lower body, for example, an image of trousers, or an image of a skirt. For another example, the first body image is a whole-body image of the target body, and the first clothes image is an image of clothes on a whole body, for example, an image of a dress. The first body image and the first clothes image may be images stored on the computer device, an image captured by the computer device from a video, or an image collected in real time by a device with an image collection function. For example, the computer device establishes a connection to a camera, and the camera transmits an image captured in real time to the computer device; or the computer device is equipped with a camera, and collects an image in real time by using the camera. A specific image used is not limited in this embodiment of this disclosure.

202: The computer device transforms the first clothes image based on a posture of the target body in the first body image to obtain a second clothes image, the second clothes image including the target clothes, and a posture of the target clothes matching the posture of the target body.

In this embodiment of this disclosure, the computer device transforms the first clothes image including the target clothes based on the posture of the target body, so that the posture of the target clothes fits the posture of the target body, to obtain the second clothes image. The second clothes image fully preserves detailed information of the target clothes, so that abundant detail features can be extracted when feature extraction is subsequently performed on the second clothes.

203: The computer device performs feature extraction on the second clothes image, an image of a bare area in the first body image, and the first body image to obtain a clothes feature, a skin feature, and a body feature respectively, the bare area being an area, of the target body in the first body image, that is not covered by clothes.

In an implementation, the computer device performs feature extraction on the second clothes image and the second body image in a plurality of dimensions to obtain the clothes feature, the skin feature, and the body feature. For example, a feature extraction task is disassembled into feature extraction sub-tasks in three dimensions. That is, the computer device performs feature extraction in a clothes dimension, a skin dimension, and an overall portrait dimension to obtain the clothes feature, the skin feature, and the body feature respectively. In this embodiment of this disclosure, features in different dimensions are extracted separately through task disassembly. On the one hand, more comprehensive and more fine-grained features can be extracted. On the other hand, feature extraction sub-tasks are performed separately, which can also reduce data processing load of the computer device in feature extraction.

204: The computer device generates a second body image based on the clothes feature, the skin feature, and the body feature, the target body in the second body image wearing the target clothes.

In an implementation, the computer device may splice features in a plurality of dimensions, that is, the clothes feature, the skin feature, and the body feature, to obtain a spliced feature. The spliced feature includes detailed information of clothes, body skin information, and global detailed information of the body. The computer device may decode the spliced feature to generate a body image of the user wearing the target clothes, that is, the second body image, to achieve a virtual dressing effect.

In the technical solution provided in this embodiment of this disclosure, the original first clothes image is first transformed based on the posture of the target body to obtain the second clothes image that fits the posture of the target body and that preserves a large amount of detailed information; and then feature extraction is performed on the second clothes image and the first body image in different dimensions based on different extraction tasks to obtain the clothes feature, the skin feature, and the body feature, that is, to obtain three more fine-grained and more accurate features in different dimensions, so that the second body image generated based on these features can include more abundant detailed information, the second body image has high authenticity, and a good virtual dressing effect is ensured.

Figure 3:
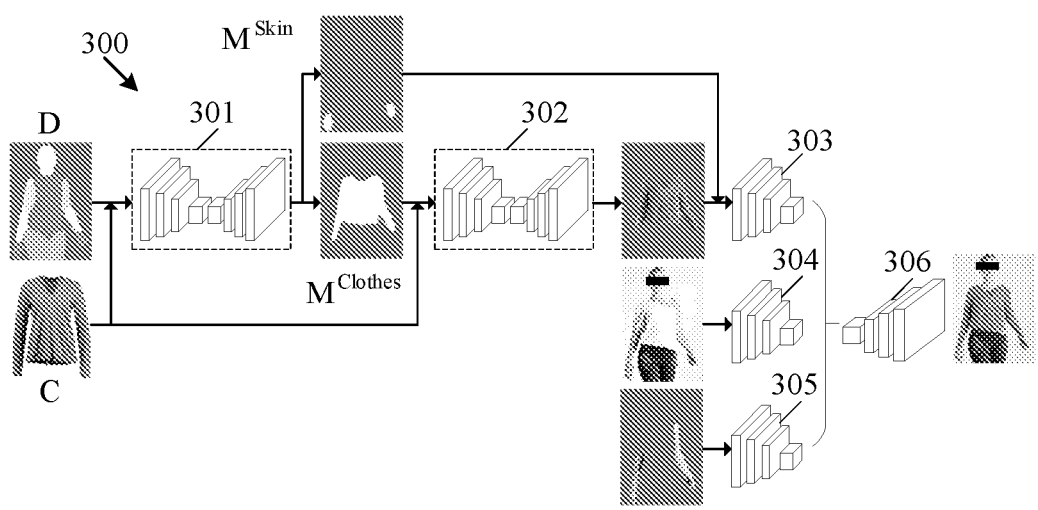
FIG. 3 is a schematic diagram of an image fusion model according to an embodiment of this disclosure.
Figure 4:
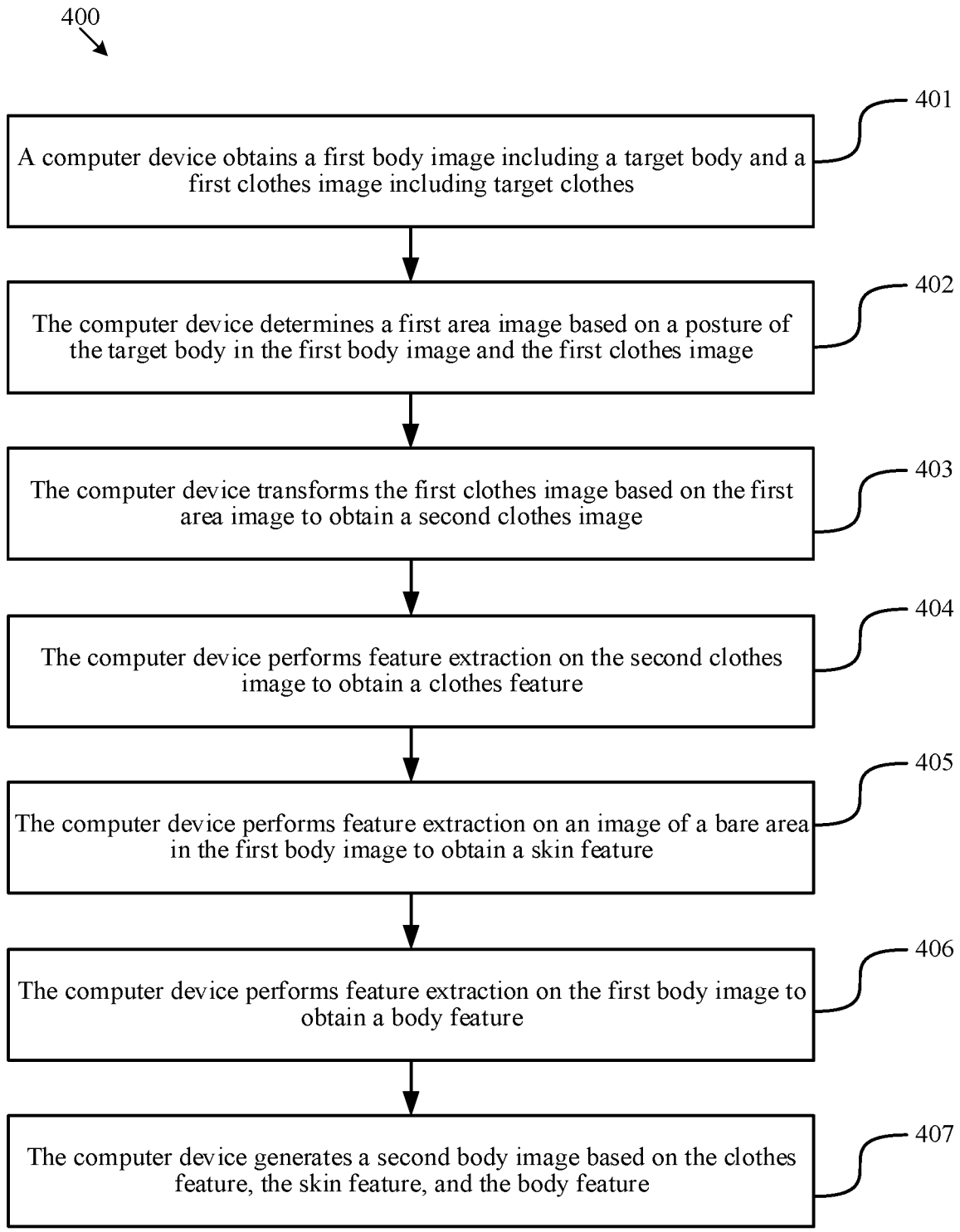
FIG. 4 is a flowchart of an image generation method according to another embodiment of this disclosure.

The foregoing embodiment is a brief introduction to an implementation of this disclosure. In an implementation, the step of obtaining the second clothes image, the feature extraction step, and the step of generating the second body image may be performed by an image fusion model. The image fusion model is a trained model, and the image fusion model may be a model stored on a computer device or a model in a network. FIG. 3 is a schematic diagram of an image fusion model according to an embodiment of this disclosure. As shown in FIG. 3, the image fusion model 300 includes a clothes area prediction network 301, a spatial transformer network 302, a clothes coding network 303, a skin coding network 304, a portrait coding network 305, and a decoding network 306. The clothes area prediction network 301 is configured to determine an area covered by target clothes after a target body wears the target clothes. The spatial transformer network 302 is configured to perform affine transformation on a clothes image based on a posture of the target body. The clothes coding network 303, the skin coding network 304, and the portrait coding network 305 are configured to extract features of a body image and the clothes image in different dimensions. The decoding network 306 is configured to decode the extracted features in a plurality of dimensions to generate a new body image. The foregoing descriptions of the image fusion model are only example descriptions, and a structure of the image fusion model is not limited in this embodiment of this disclosure. The process of generating an image by the image fusion model shown in FIG. 3 is only used as an example for description. FIG. 4 is a flowchart of an image generation method 400 according to an embodiment of this disclosure. The image generation method is described below with reference to FIG. 3 and FIG. 4. In an implementation, the image generation method includes the following steps.

401: A computer device obtains a first body image including a target body and a first clothes image including target clothes.

In an implementation, the computer device obtains the first body image and the first clothes image in response to a virtual dressing instruction. For example, the computer device is a terminal used by a user, and a target application program run on the computer device supports a virtual dressing function. For example, the target application program is an e-commerce application program. The computer device obtains the first body image and the first clothes image in response to a virtual dressing instruction triggered by the user in the e-commerce application program. The first body image may be an image prestored on the computer device or an image captured in real time by the computer device by using a camera. The first clothes image may be an image prestored on the computer device or an image in the e-commerce application program, that is, an image corresponding to target clothes selected by the user in the e-commerce application program. A method for obtaining the first body image and the first clothes image is not limited in this embodiment of this disclosure.

In an implementation, after obtaining the first body image and the first clothes image, the computer device may preprocess the first body image and the first clothes image. The preprocessing the first body image and the first clothes image by the computer device may be at least one of adjusting sizes of the images and performing image enhancement processing on the images. The image enhancement processing may be performing at least one of noise reduction, contrast enhancement, and the like on the images, to suppress useless information in the images, improve visual effects of the images, and adjust the images to a form more suitable for machine analysis and processing.

402: The computer device determines a first area image based on a posture of the target body in the first body image and the first clothes image.

The first area image is used for indicating an area covered by the target clothes when the target body wears the target clothes. For example, the first area image may be a binary mask image. A pixel in the area covered by the target clothes is represented as a first value, and a pixel in another area is represented as a second value.

In an implementation, the computer device first performs body area recognition on the first body image, and sets pixels belonging to a same body area in the first body image to a same pixel value to obtain a body semantic image, and then determines the first area image based on the body semantic image and the first clothes image. The body semantic image is used for indicating the posture of the target body. The computer device can distinguish between body areas of the target body based on the body semantic image.

In an implementation, the computer device obtains the body semantic image by using a body area recognition network. The body area recognition network is constructed based on a convolutional neural network, and includes at least one operation layer for extracting body semantic features. For example, the body area recognition network may be a fully convolutional network (FCN). A structure of the body area recognition network is not limited in this disclosure. For example, the computer device inputs the first body image to the body area recognition network, at least one convolutional layer in the body area recognition network performs feature extraction on the first body image, the feature image outputted by the last convolutional layer is upsampled through deconvolution to restore the feature image to a size the same as that of the first body image, and then pixels are classified based on the upsampled feature image to determine a body area to which each pixel belongs, so as to obtain the body semantic image. The foregoing descriptions of the method for obtaining the body semantic image are only example descriptions of an implementation, and a specific method for obtaining the body semantic image is not limited in this embodiment of this disclosure.

Figure 5:
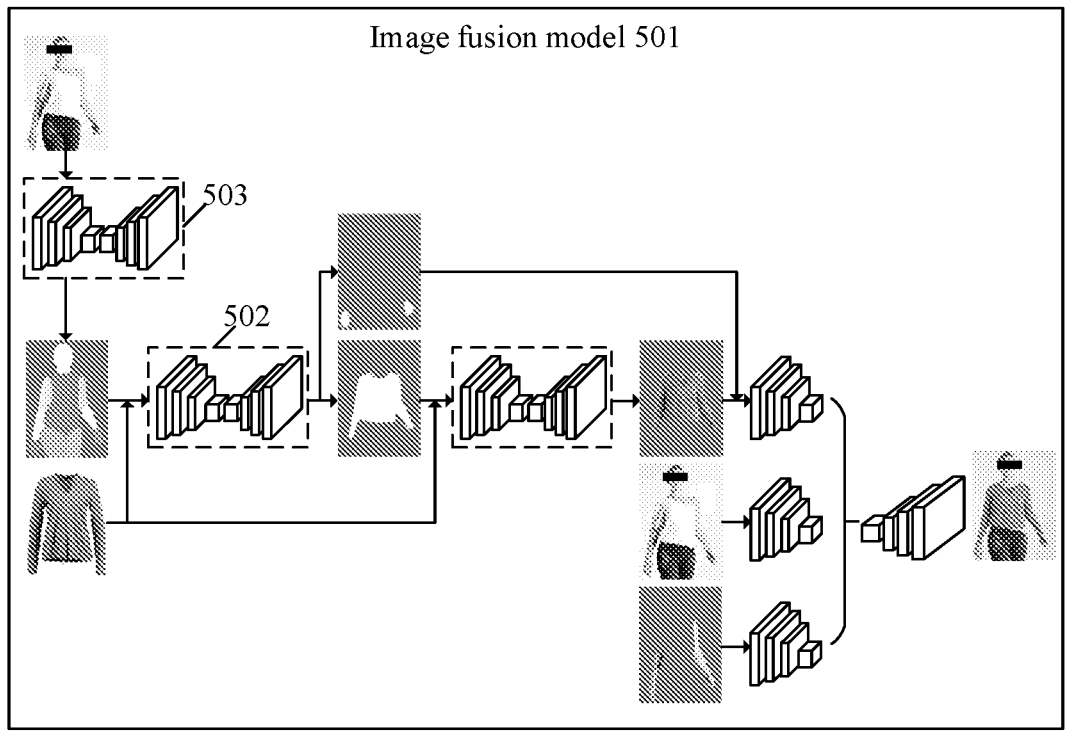
FIG. 5 is a schematic diagram of an image fusion model according to an embodiment of this disclosure.

In an implementation, the body area recognition network may be included in an image fusion model. FIG. 5 is a schematic diagram of an image fusion model 501 according to an embodiment of this disclosure. As shown in FIG. 5, the body area recognition network 503 is set before a clothes area prediction network 502 in the image fusion model 501. In an implementation, the body area recognition network may alternatively not be included in an image fusion model.

That is, after obtaining the first body image and the first clothes image, the computer device first obtains a body semantic image based on the first body image, and then inputs the body semantic image and the first clothes image to an image fusion model, and the image fusion model performs a subsequent image generation step. This is not limited in this embodiment of this disclosure.

In an implementation, after obtaining the body semantic image, the computer device inputs the body semantic image and the first clothes image to a clothes area prediction network (mask prediction network, MPN) of the image fusion model. The clothes area prediction network may be implemented as an encoder-decoder structure, and an encoder part and a decoder part each include a plurality of convolutional layers. For example, the computer device extracts, by using the clothes area prediction network, a body posture feature corresponding to the body semantic image and a contour feature of the target clothes in the first clothes image, that is, downsamples the body semantic image and the first clothes image by using convolutional layers in the encoder part in the clothes area prediction network. The computer device determines the first area image based on the body posture feature and the contour feature of the target clothes, that is, upsamples, by using convolutional layers in the decoder part in the clothes area prediction network, the features outputted by the encoder, to obtain the first area image. In the first area image, when the target body wears the target clothes, a pixel in an area covered by the target clothes is a first value, and a pixel in another area is a second value. The foregoing descriptions of the method for obtaining the first area image are only example descriptions of an implementation, and a specific method for obtaining the first area image is not limited in this embodiment of this disclosure.

In an implementation, the clothes area prediction network may further output a second area image. The second area image is used for indicating and the first area image is used for indicating a bare area, that is, a bare skin area, for example, a hand area, in the target body image when the target body wears the target clothes. As shown in FIG. 3, the body semantic image D and the first clothes image C are inputted to the clothes prediction network, and the clothes prediction network outputs the first area image $M^{clothes}$ and the second area image $M^{skin}$. In an implementation, the second image area may be used in a subsequent feature extraction step, so that the image fusion model can determine features of the bare skin area, for example, a contour feature and a position feature of the skin area, and the image fusion model can generate a new body image more accurately.

In this embodiment of this disclosure, the first area image is obtained first, that is, a posture of the target clothes is determined first, and then affine transformation is performed on the clothes, so that the clothes image can fit the posture of the target body, thereby effectively improving accuracy of the affine transformation of the clothes, and improving authenticity of a clothes image obtained through affine transformation.

403: The computer device transforms the first clothes image based on the first area image to obtain a second clothes image.

Figure 6:
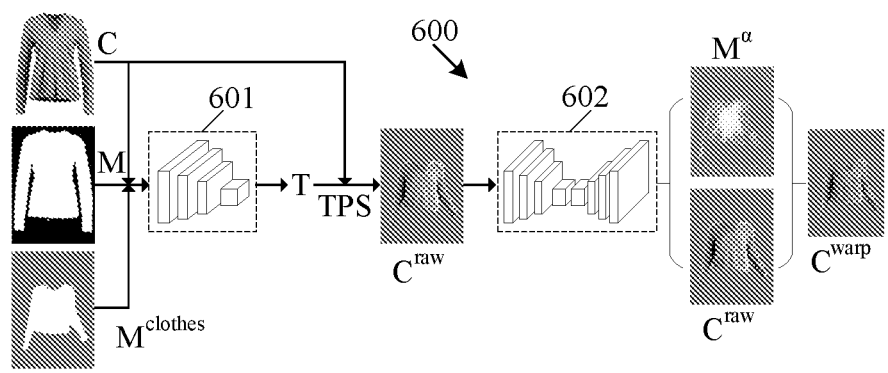
FIG. 6 is a schematic diagram of a spatial transformer network according to an embodiment of this disclosure.

In this embodiment of this disclosure, the computer device may transform the first clothes by using the spatial transformer network in the image fusion model to obtain the second clothes image. FIG. 6 is a schematic diagram of a spatial transformer network 600 according to an embodiment of this disclosure. As shown in FIG. 6, the spatial transformer network 600 includes a transformation matrix prediction sub-network 601 and a clothes generation sub-network 602. For example, the transformation matrix prediction sub-network and the clothes generation sub-network each include a plurality of operation layers, and the operation layers may be a convolutional layer, a pooling layer, and the like. This is not limited in this embodiment of this disclosure. The transformation matrix prediction sub-network is configured to determine an affine transformation matrix to be used for the first clothes image in affine transformation. The clothes generation sub-network includes a clothes detail feature, and can further modify a clothes image.

A method for obtaining the second clothes image is described below with reference to FIG. 6. In an implementation, the computer device inputs the first area image and the first clothes image to the spatial transformer network of the image fusion model. The spatial transformer network transforms the first clothes image based on a mapping relationship between the first clothes image and a first mask area to obtain an intermediate clothes image, the first mask area being used for indicating an area in which the target clothes are located in the first clothes image. Then the computer device determines a texture feature corresponding to the intermediate clothes image by using the spatial transformer network, and generates the second clothes image based on the texture feature and the intermediate clothes image.

In some embodiments, before inputting the first clothes image to the spatial transformer network, the computer device may further obtain the first mask area corresponding to the first clothes image, namely, an initial area image corresponding to the first clothes image. The initial area image is used for indicating an area in which the target clothes is located in the first clothes image, and the initial area image is used for assisting in determining the first area image.

In some embodiments, the computer device determines an initial contour of the target clothes based on the first mask area; determines, based on the first area image, a target contour corresponding to the target clothes after the transformation; determines a mapping relationship between the initial contour and the target contour based on the initial contour and the target contour; and transforms the first clothes image based on the mapping relationship to obtain the intermediate clothes image.

In some embodiments, the computer device performs a clothes contour recognition processing based on the initial area image to determine an initial contour of the target clothes; determines, based on the first area image, a target contour corresponding to the target clothes after the transformation; and obtains a mapping relationship between the initial contour and the target contour, namely, a correspondence between the target clothes before the transformation and the target clothes after the transformation, by performing contour comparison between the initial contour and the target contour. The mapping relationship between the initial contour and the target contour can assist the computer device in adjusting a shape of the target clothes in a process of transforming the target clothes.

As shown in FIG. 6, the computer device inputs the first clothes image C, the initial area image M, and the first area image $M^{clothes}$ to the spatial transformer network; the transformation matrix prediction sub-network in the spatial transformer network predicts an affine transformation matrix T corresponding to the first clothes image; and then a thin plate spline (TPS) algorithm is called to transform the first clothes image based on the affine transformation matrix T, that is, adjust a position of each pixel in the first clothes image based on the affine transformation matrix T, to obtain the intermediate clothes image $C^{raw}$. In the intermediate clothes image, a posture of the target clothes fits a posture of the target body.

In some embodiments, the spatial transformer network includes a clothes generation sub-network. The computer device can further modify the intermediate clothes image based on the clothes generation sub-network, and add detailed information; and the computer device performs feature extraction on the intermediate clothes image based on the clothes generation sub-network and according to a pre-learned clothes detail feature to obtain the texture feature corresponding to the intermediate clothes image.

In a specific application, as shown in FIG. 6, the clothes generation sub-network outputs the intermediate clothes image $C^{raw}$ and a texture feature image $M^{\alpha}$ including the texture feature, and generates the second clothes image $C^{warp}$. In an implementation, the clothes detail feature included in the clothes generation sub-network may be learned in a model training stage, that is, the clothes generation sub-network performs feature extraction on the intermediate clothes image based on the pre-learned clothes detail feature to obtain the texture feature corresponding to the intermediate clothes image. In some embodiments, the first clothes image may be alternatively inputted to the clothes generation sub-network, and the clothes generation sub-network learns a clothes detail feature of the target clothes in the first clothes image, and predicts the texture feature based on the learned clothes detail feature. This is not limited in this embodiment of this disclosure. The foregoing descriptions of the method for obtaining the second clothes image are only example descriptions of an implementation, and a specific method for obtaining the second clothes image is not limited in this embodiment of this disclosure. In this embodiment of this disclosure, the clothes generation sub-network further modifies the intermediate clothes image, so that a texture of the target clothes can be preserved to the greatest extent, and the generated second clothes image has a more natural visual effect.

The foregoing descriptions of the method for transforming a clothes image are only example descriptions of an implementation. In some embodiments, optical flow transformation may be alternatively used instead of affine transformation to better preserve the clothes to obtain detailed information. A specific manner of transforming a clothes image is not limited in this embodiment of this disclosure.

Step 402 and step 403 are steps of transforming the first clothes image based on the posture of the target body in the first body image to obtain the second clothes image, the second clothes image including the target clothes, and the posture of the target clothes matching the posture of the target body. In this embodiment of this disclosure, affine transformation is first performed on clothes to obtain a clothes image that fits a body posture. In this process, posture information of the target body can be accurately captured, and detailed information of the clothes can also be fully preserved. For example, texture information, a neckline, cuffs, and other detailed information of the clothes are preserved to the greatest extent.

404: The computer device performs feature extraction on the second clothes image to obtain a clothes feature.

In this embodiment of this disclosure, the computer device may perform feature extraction on the second clothes image by using a clothes coding network of the image fusion model to obtain the clothes feature. In an implementation, a coding network structure in ResUnet (an image generation network) may be used for the clothes coding network. The clothes coding network includes a plurality of cascaded operation layers. The computer device extracts features of the second clothes image layer by layer by using the plurality of cascaded operation layers, to obtain a coding vector outputted by each operation layer as a clothes sub-feature. Each clothes sub-feature includes global and local feature information of the target clothes in the second clothes image. The computer device uses each clothes sub-feature as a clothes feature corresponding to the target clothes. For example, clothes sub-features outputted by the operation layers have different scales. For example, a clothes sub-feature outputted by an operation layer whose position is closer to the front has a larger scale, and can preserve more detailed information of the clothes; and a clothes sub-feature outputted by an operation layer whose position is closer to the back has a smaller scale, and can reflect a global feature of the clothes. In some embodiments, the clothes sub-features may all be represented in a form of vectors, to ensure consistency of expression forms of the clothes sub-features and achieve unified expression of features. In some other embodiments, a clothes sub-feature of a larger scale may be represented in a form of a matrix, and a clothes sub-feature of a smaller scale may be represented in a form of a vector. In this way, clothes sub-features of different scales can be more accurately expressed in a differentiated manner, thereby improving accuracy of feature expression.

In an implementation, as shown in FIG. 3, the computer device may input both the second clothes image and the second area image obtained in step 402 to the clothes coding network, and the clothes coding network performs a subsequent clothes feature extraction step based on the first clothes image and the second area image. The second area image can accurately show a bare area of the target body after the target body wears the target clothes. In a clothes feature extraction process, the second area image can be used to assist the clothes coding network in determining a relative position relationship between the target clothes and the target body, that is, a status of covering the target body by the target clothes, so that the clothes coding network can extract a more accurate clothes feature.

The foregoing descriptions of the method for obtaining the clothes feature are only example descriptions of an implementation, and a specific method for obtaining the clothes feature is not limited in this embodiment of this disclosure.

405: The computer device performs feature extraction on an image of a bare area in the first body image to obtain a skin feature.

The bare area is an area, of the target body in the first body image, that is not covered by clothes. In an implementation, the computer device may recognize the bare area, that is, a skin area, in the first body image by using a skin area recognition network, to obtain a binary image. In the binary image, a pixel belonging to the skin area is represented as a third value, and a pixel belonging to another area is represented as a fourth value. A structure of the skin area recognition network and a method for recognizing the skin area are not limited in this embodiment of this disclosure.

In an implementation, the computer device may perform image segmentation on the first body image based on the binary image to obtain the image of the bare area in the first body image, and input the image of the bare area to a skin coding network of the image fusion model, and the skin coding network performs feature extraction on the image of the bare area in the first body image to obtain the skin feature. In this embodiment of this disclosure, a structure of the skin coding network is the same as the structure of the clothes coding network, and a process of extracting the skin feature is similar to the process of extracting the clothes feature in step 404. The computer device obtains skin sub-features of different scales that are outputted by operation layers in the skin coding network, and uses the plurality of skin sub-features as the skin feature.

406: The computer device performs feature extraction on the first body image to obtain a body feature.

In an implementation, the computer device performs feature extraction on the first body image by using a portrait coding network of the image fusion model to obtain the body feature. In this embodiment of this disclosure, a structure of the portrait coding network is the same as the structure of the clothes coding network, and a process of extracting the body feature is similar to the process of extracting the clothes feature in step 404. The computer device obtains body sub-features of different scales that are outputted by operation layers in the portrait coding network, and uses the plurality of body sub-features as the body feature.

Step 404 to step 406 are steps of performing feature extraction on the second clothes image, the image of the bare area in the first body image, and the first body image to obtain the clothes feature, the skin feature, and the body feature respectively. In this embodiment of this disclosure, an execution order of first obtaining the clothes feature and then obtaining the skin feature and the portrait feature is used for description. In some embodiments, the clothes feature, the skin feature, and the portrait feature may be alternatively obtained simultaneously. An order of obtaining the three features, that is, an order of performing step 404, step 405, and step 406, is not limited. In this embodiment of this disclosure, feature extraction is performed separately in a plurality of dimensions through task disassembly. On the one hand, more comprehensive and more finer-grained features can be extracted. On the other hand, three feature extraction tasks are performed separately, which can also reduce operation load of the computer device in a feature extraction process and improve device performance.

407: The computer device generates a second body image based on the clothes feature, the skin feature, and the body feature.

Figure 7:
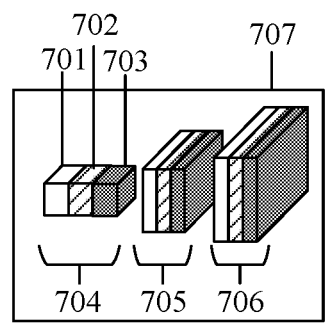
FIG. 7 is a schematic diagram of feature splicing according to an embodiment of this disclosure.

In an implementation, the computer device splices the clothes feature, the skin feature, and the body feature to obtain a spliced feature. For example, the clothes feature, the skin feature, and the body feature each include sub-features of at least two scales, and the computer device separately splices sub-features of same scales in the clothes feature, the skin feature, and the body feature to obtain at least two spliced sub-features, and then splices the at least two spliced sub-features to obtain the spliced feature. FIG. 7 is a schematic diagram of a spliced feature according to an embodiment of this disclosure. As shown in FIG. 7, a clothes sub-feature 701, a skin sub-feature 702, and a portrait sub-feature 703 of a same scale are spliced to obtain a spliced sub-feature 704, and then spliced sub-features 704, 705, and 706 of different scales are spliced to obtain a spliced feature 707. The foregoing descriptions of the feature splicing method are only example descriptions, and the computer device may alternatively splice and combine features in different dimensions by using another method. This is not limited in this embodiment of this disclosure.

Figure 8:
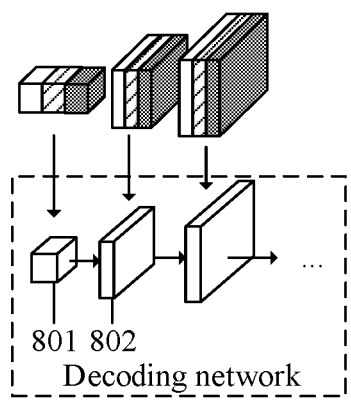
FIG. 8 is a schematic diagram of a decoding network according to an embodiment of this disclosure.

In this embodiment of this disclosure, the computer device performs decoding by using a decoding network in the image fusion model and based on the spliced feature to generate the second body image. The target body in the second body image wears the target clothes. In an implementation, a decoding network structure in the ResUnet may be used for the decoding network. The decoding network includes a plurality of cascaded operation layers, and the computer device upsamples the spliced features by using the plurality of operation layers to generate the second body image. FIG. 8 is a schematic diagram of a decoding network according to an embodiment of this disclosure. The computer device may separately input spliced sub-features of different scales in the spliced features to corresponding operation layers in the decoding network. For example, a spliced sub-feature of a first scale is input to an operation layer 801 of the first scale, and a spliced sub-feature of a second scale is input to an operation layer 802 of the second scale. In this embodiment of this disclosure, spliced sub-features of different scales can preserve detail features of different granularities. The second body image generated by the decoding network by decoding the spliced sub-features of different scales can fully preserve detailed information of clothes obtained through affine transformation, body skin information, and global detailed information of the body, to achieve a real virtual dressing effect.

In the technical solution provided in this embodiment of this disclosure, the original first clothes image is first transformed based on the posture of the target body to obtain the second clothes image that fits the posture of the target body and that preserves a large amount of detailed information; and then feature extraction is performed on the second clothes image and the first body image in different dimensions based on different extraction tasks to obtain the clothes feature, the skin feature, and the body feature, that is, to obtain three more fine-grained and more accurate features in different dimensions, so that the second body image generated based on these features can include more abundant detailed information, the second body image has high authenticity, and a good virtual dressing effect is ensured. In addition, in this embodiment of this disclosure, operation load of the computer device in a feature extraction and image generation process can be effectively reduced through task disassembly, thereby reducing operation resource expenditures and improving device performance. With the technical solution provided in this embodiment of this disclosure, vivid virtual dressing portraits can be generated based on images with different resolutions in different application scenarios, and the solution has good robustness in business scenarios.

Figure 9:
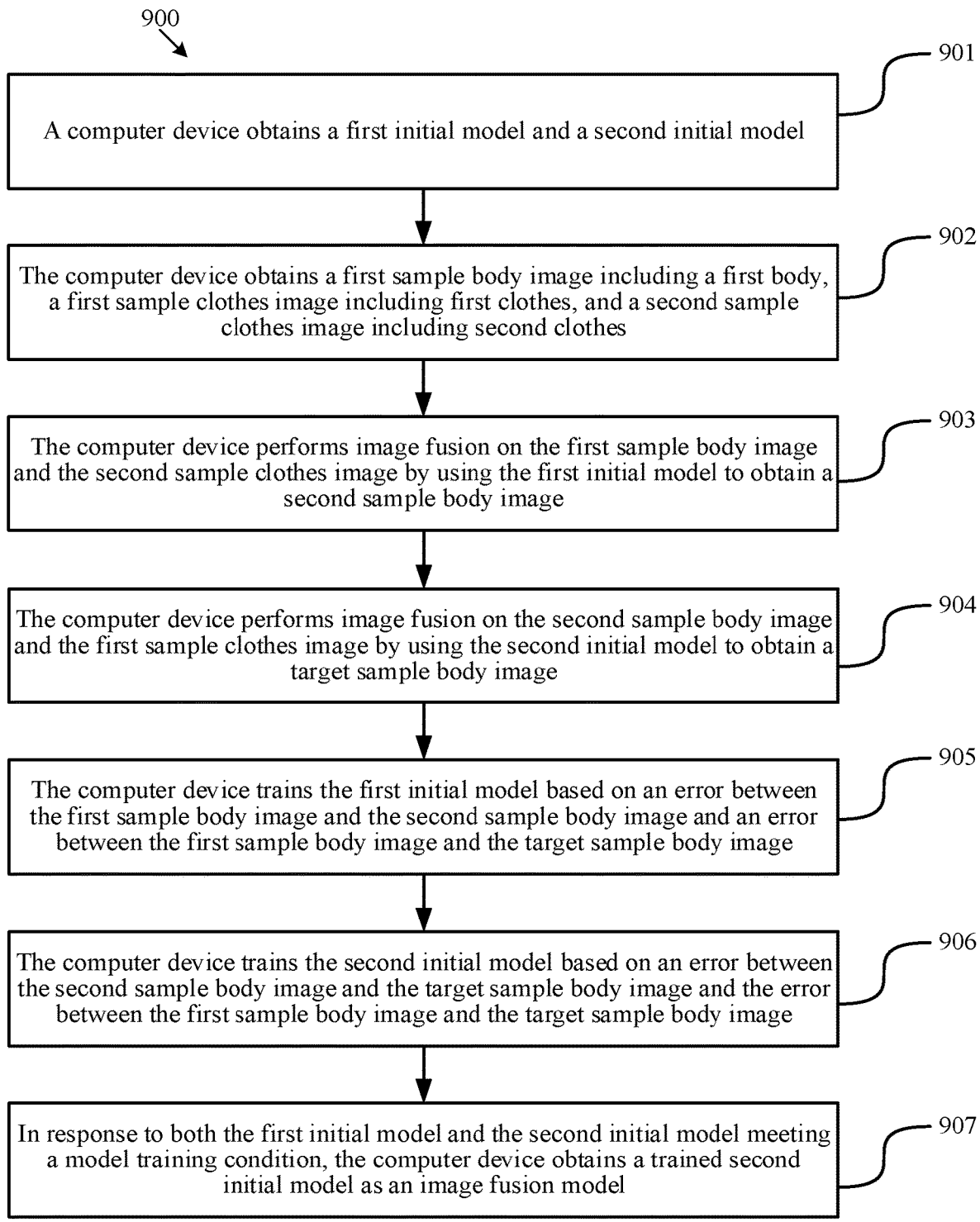
FIG. 9 is a flowchart of a training method for an image fusion model according to an embodiment of this disclosure.

The image fusion model in the foregoing embodiment is a pre-trained model stored on the computer device, and the image fusion model is a model trained by the computer device or a model trained by another device. FIG. 9 is a flowchart of a training method 900 for an image fusion model according to an embodiment of this disclosure. As shown in FIG. 9, in an implementation, the training method 900 for an image fusion model includes the following steps.

901: A computer device obtains a first initial model and a second initial model.

Structures of the first initial model and the second initial model are the same. The structures of the first initial model and the second initial model are shown in FIG. 3, and both models are models constructed based on a convolutional neural network (CNN).

902: The computer device obtains a first sample body image including a first body, a first sample clothes image including first clothes, and a second sample clothes image including second clothes.

The first body in the first sample body image wears the first clothes, and the first clothes is different from the second clothes. In an implementation, the first sample body image carries annotation information, and the annotation information is used for distinguishing between body areas of a first sample body, so that the model can perform a subsequent image generation step. Certainly, other information may be alternatively annotated in the first sample body image, the first clothes image, and the second clothes image. This is not limited in this embodiment of this disclosure.

In an implementation, after obtaining a sample body image and a sample clothes image, the computer device may preprocess the images. For example, the preprocessing may be adjusting sizes of the images or performing image enhancement processing.

903: The computer device performs image fusion on the first sample body image and the second sample clothes image by using the first initial model to obtain a second sample body image.

In this embodiment of this disclosure, the computer device inputs the first sample body image and the second sample clothes image to the first initial model, and the first initial model generates the second sample body image based on a feature of the first body and a feature of the second clothes. The first body in the second sample body image wears the second clothes. A process of generating the second sample body image by the computer device by using the first initial model is similar to the process of step 402 to step 407.

904: The computer device performs image fusion on the second sample body image and the first sample clothes image by using the second initial model to obtain a target sample body image.

In this embodiment of this disclosure, the computer device inputs the second sample body image and the first clothes image to the second initial model, and the second initial model generates the target sample body image based on the feature of the first body and a feature of the first clothes. The first body in the target sample body image wears the first clothes. A process of generating the target sample body image by the computer device by using the second initial model is similar to the process of step 402 to step 407.

905: The computer device trains the first initial model based on an error between the first sample body image and the second sample body image and an error between the first sample body image and the target sample body image.

In this embodiment of this disclosure, the computer device may obtain errors in a plurality of dimensions. In an implementation, the computer device determines a first error based on a difference in pixel value distribution between the first sample body image and the second sample body image. The first error is used for measuring distribution consistency (adversarial loss) of a generated image, that is, measuring a difference in pixel value distribution between a body image generated by the model and an input body image, and a difference in pixel value distribution between the body image generated by the model and an image of a bare area in the input body image. In an implementation, the computer device separately obtains pixel value distribution histograms of the first sample body image and the second sample body image, and obtains an error between the two pixel value distribution histograms as the first error. Certainly, the computer device may alternatively obtain the first error in another manner. This is not limited in this embodiment of this disclosure. In this embodiment of this disclosure, the first error is obtained, that is, consistency of pixel value distribution is constrained, which can help the model generate a more real body image, and better restore skin in the body image.

In an implementation, the computer device determines an error between a pixel value matrix corresponding to the first sample body image and a pixel value matrix corresponding to the second sample body image as a second error. The second error is used for measuring pixel value consistency (preserving loss) between an input image and an output image of the model. In this embodiment of this disclosure, the second error can indicate a consistency difference between a clothes area and an arm area of an input body image of the model and corresponding areas in an output body image. In an implementation, the computer device may use an L1 loss function to obtain the second error between the first sample body image and the second sample body image. Certainly, the computer device may alternatively obtain the second error by using another method. This is not limited in this embodiment of this disclosure. In this embodiment of this disclosure, the second error is obtained, that is, pixel value consistency between images is constrained, so that the model can fully preserve detailed information of body parts such as lower limbs, lower clothing, a face, and hair.

In an implementation, the computer device determines an error between the pixel value matrix corresponding to the first sample body image and a pixel value matrix corresponding to the target sample body image as a third error. The third error is used for indicating a cyclic consistency error between the two models, and the third error is used for measuring an error between the first sample body image inputted by the first initial model and the target sample body image outputted by the second initial model. In an implementation, the computer device may use the L1 loss function to obtain the third error between the first sample body image and the target sample body image. Certainly, the computer device may alternatively obtain the third error by using another method. This is not limited in this embodiment of this disclosure. In this embodiment of this disclosure, the third error is obtained, that is, a cyclic consistency constraint is designed, so that the target sample body image outputted by the second initial model can approximate the original first sample body image to the greatest extent.

In an implementation, the computer device determines an error between an image feature of a clothes area in the first sample body image and an image feature of a clothes area in the target sample body image as a fourth error. The fourth error is used for indicating a difference between clothes in the target sample body image and clothes in the original first sample body image. In this embodiment of this disclosure, the computer device obtains, through segmentation, an image of the clothes area from the first sample body image to obtain a first segmented image; obtains, through segmentation, an image of the clothes area from the target sample body image to obtain a second segmented image; and inputs the first segmented image and the second segmented image to a visual geometry group (VGG) network for feature extraction, to obtain an image feature outputted by each operation layer in the VGG network. The computer device obtains an error between image features, at a same operation layer, of the first segmented image and the second segmented image, that is, obtains a Euclidean distance between the image features at the operation layer. The computer device determines the fourth error based on a plurality of Euclidean distances that are obtained, for example, obtains the fourth error by averaging the plurality of Euclidean distances. It should be noted that, the foregoing description of the method for acquiring the fourth error is merely an example description. This embodiment of this disclosure sets no limitation on a specific method for acquiring the fourth error. In this embodiment of this disclosure, the fourth error is obtained, that is, clothes feature consistency is constrained, so that authenticity of clothes in a body image generated by the model can be improved.

In this embodiment of this disclosure, the computer device adjusts a model parameter of the first initial model based on the first error, the second error, the third error, and the fourth error. For example, the computer device separately backpropagates the first error, the second error, the third error, and the fourth error to the first initial model, to solve a parameter at each operation layer in the first initial model, so as to adjust the parameter at each operation layer in the first initial model. The foregoing descriptions of the method for adjusting a parameter of the first initial model are only example descriptions, and a specific method for adjusting a parameter of the first initial model is not limited in this embodiment of this disclosure.

906: The computer device trains the second initial model based on an error between the second sample body image and the target sample body image and the error between the first sample body image and the target sample body image.

In an implementation, the computer device determines a fifth error based on a difference in pixel value distribution between the second sample body image and the target sample body image; determines an error between a pixel value matrix corresponding to the second sample body image and a pixel value matrix corresponding to the target sample body image as a sixth error; determines an error between a pixel value matrix corresponding to the first sample body image and the pixel value matrix corresponding to the target sample body image as a seventh error; determines an error between a feature of the first sample clothes image and a feature of the second sample clothes image as an eighth error; and adjusts a model parameter of the second initial model based on the fifth error, the sixth error, the seventh error, and the eighth error. Processes of obtaining the fifth error, the sixth error, the seventh error, and the eighth error are similar to the processes of obtaining the first error, the second error, the third error, and the fourth error respectively. In this embodiment of this disclosure, the computer device may backpropagate the fifth error, the sixth error, the seventh error, and the eighth error to the second initial model, to solve a parameter at each operation layer in the second initial model. A specific method for adjusting a parameter of the second initial model is not limited in this embodiment of this disclosure.

907: In response to that both the first initial model and the second initial model meet a model training condition, the computer device obtains a trained second initial model as an image fusion model.

The model training condition is set by a developer. This is not limited in this embodiment of this disclosure. For example, the model training condition includes a training times threshold. If a quantity of times of model training reaches the training times threshold, the trained second initial model is obtained as the image fusion model; or if a quantity of times of model training does not reach the training times threshold, a next group of sample images is further obtained to train the first initial model and the second initial model. For example, the model training condition includes an error threshold. If error values corresponding to model output results are all less than the error threshold and a quantity of times that the error values corresponding to the model output results are all less than the error threshold reaches a target quantity of times, it is determined that both the first initial model and the second initial model meet the model training condition, and the trained second initial model is obtained as the image fusion model; otherwise, a next group of sample images is further obtained for model training.

Figure 10:
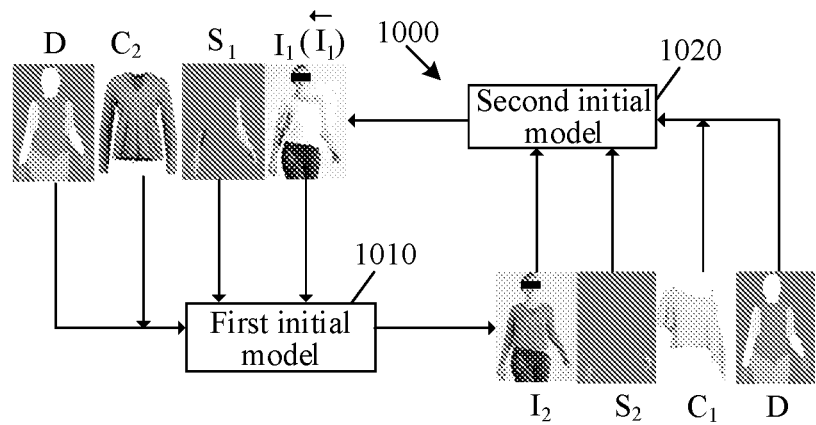
FIG. 10 is a schematic diagram of a model training method according to an embodiment of this disclosure.

In this embodiment of this disclosure, training data for virtual dressing is unpaired, and therefore a self-supervised model training method with cyclic consistency is introduced. FIG. 10 is a schematic diagram of a model training method according to an embodiment of this disclosure. The foregoing model training process 1000 is described below with reference to FIG. 10. As shown in FIG. 10, a computer device inputs a first sample body image $I_1$ and a second sample clothes image $C_2$ to a first initial model 1010, and the first initial model 1010 outputs an intermediate virtual dressing result, namely, a second sample body image $I_2$. Then the computer device inputs the second sample body image $I_2$ and the first sample clothes image $C_1$ to a second initial model 1020, and obtains a target sample body image $\overline{I_1}$ outputted by the second initial model 1020. The computer device controls $\overline{I_1} \approx I_1$, that is, makes the target sample body image tend to be consistent with the first sample body image, to implement self-supervised model training with cyclic consistency. In addition, in this embodiment of this disclosure, in a case of generating a new body image based on an original body image and an original clothes image, a virtual dressing task is disassembled into three tasks through task disassembly: affine transformation of clothes, body skin generation, and global body information synthesis, and corresponding coding networks are respectively set for the sub-tasks to perform feature extraction in different dimensions. On the one hand, more comprehensive and more fine-grained features can be obtained. On the other hand, the three tasks are performed separately, which can reduce operation load of the computer device in the virtual dressing task, and improve device performance of the computer device in the virtual dressing task. In terms of loss function settings, in this embodiment of this disclosure, four loss functions are proposed to obtain error values in four dimensions, so that an image fusion model obtained through training can adaptively preserve features of related parts, for example, features of body parts such as lower limbs, a face, and hair. In this way, the image fusion model can adaptively generate body skin covered by clothes. For example, when a long-sleeved top is replaced with a short-sleeved top, an image of an arm area of the body can be accurately constructed, so that the model can achieve a photo-level virtual dressing effect.

All the foregoing exemplary technical solutions may be randomly combined to form exemplary embodiments of this disclosure.

Figure 11:
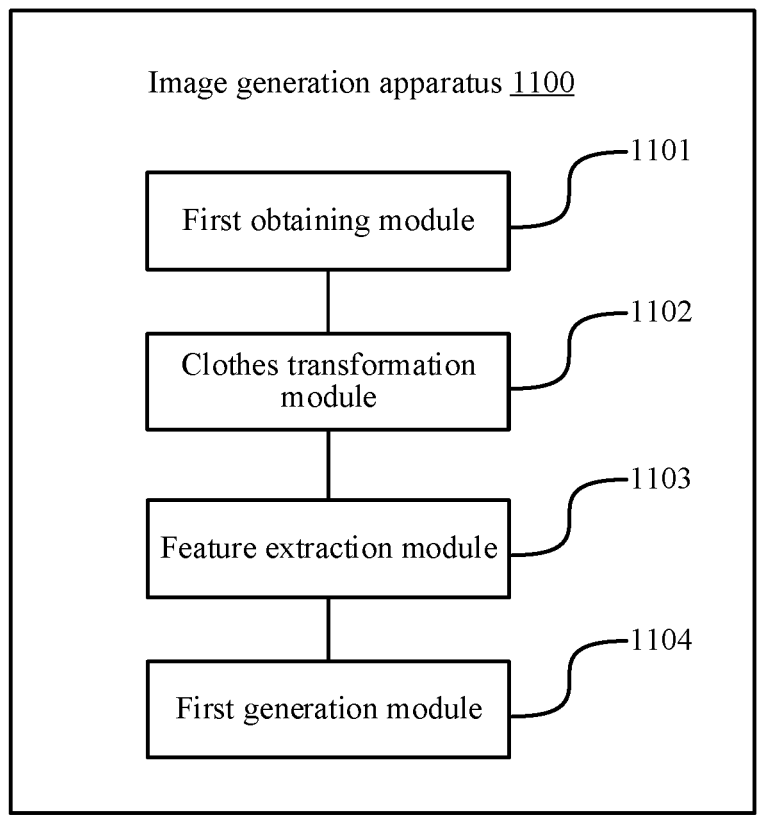
FIG. 11 is a schematic structural diagram of an image generation apparatus according to an embodiment of this disclosure.

FIG. 11 is a schematic structural diagram of an image generation apparatus 1100 according to an embodiment of this disclosure. As shown in FIG. 11, the apparatus 1100 includes:
  a first obtaining module 1101, configured to obtain a first body image including a target body and a first clothes image including target clothes;
  a clothes transformation module 1102, configured to transform the first clothes image based on a posture of the target body in the first body image to obtain a second clothes image, the second clothes image including the target clothes, and a posture of the target clothes matching the posture of the target body;
  a feature extraction module 1103, configured to perform feature extraction on the second clothes image, an image of a bare area in the first body image, and the first body image to obtain a clothes feature, a skin feature, and a body feature respectively, the bare area being an area, of the target body in the first body image, that is not covered by clothes; and a first generation module 1104, configured to generate a second body image based on the clothes feature, the skin feature, and the body feature, the target body in the second body image wearing the target clothes.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In an implementation, the clothes transformation module 1102 includes:

an area determining sub-module, configured to determine a first area image based on a posture of the target body in the first body image and the first clothes image, the first area image being used for indicating an area covered by the target clothes when the target body wears the target clothes; and a clothes transformation sub-module, configured to transform the first clothes image based on the first area image to obtain the second clothes image.

In an implementation, the area determining sub-module includes:

an area recognition unit, configured to perform body area recognition on the first body image, and set pixels belonging to a same body area in the first body image to a same pixel value to obtain a body semantic image, the body semantic image being used for indicating the posture of the target body; and an area determining unit, configured to determine the first area image based on the body semantic image and the first clothes image.

In an implementation, the area determining unit is configured to input the body semantic image and the first clothes image to a clothes area prediction network of an image fusion model. The clothes area prediction network extracts a body posture feature corresponding to the body semantic image and a contour feature of the target clothes in the first clothes image, and determines the first area image based on the body posture feature and the contour feature of the target clothes.

In an implementation, the clothes transformation sub-module is further configured to input the first area image and the first clothes image to a spatial transformer network of the image fusion model, the spatial transformer network being configured to transform an image. The spatial transformer network transforms the first clothes image based on a mapping relationship between the first clothes image and a first mask area to obtain an intermediate clothes image; and the spatial transformer network determines a texture feature corresponding to the intermediate clothes image, and generates the second clothes image based on the texture feature and the intermediate clothes image.

In an implementation, the clothes transformation sub-module is further configured to determine an initial contour of the target clothes based on the first mask area, and determine, based on the first area image, a target contour corresponding to the target clothes after the transformation; determine a mapping relationship between the initial contour and the target contour based on the initial contour and the target contour; and transform the first clothes image based on the mapping relationship to obtain the intermediate clothes image.

In an implementation, the spatial transformer network includes a clothes generation sub-network; and the clothes transformation sub-module is further configured to perform feature extraction on the intermediate clothes image based on the clothes generation sub-network and according to a pre-learned clothes detail feature to obtain the texture feature corresponding to the intermediate clothes image.

In an implementation, the feature extraction module 1103 is further configured to perform feature extraction on the second clothes image by using a clothes coding network of the image fusion model to obtain the clothes feature; perform feature extraction on the image of the bare area in the first body image by using a skin coding network of the image fusion model to obtain the skin feature; and perform feature extraction on the first body image by using a portrait coding network of the image fusion model to obtain the body feature.

In an implementation, the first generation module 1104 includes:

a feature splicing sub-module, configured to splice the clothes feature, the skin feature, and the body feature to obtain a spliced feature; and an image generation sub-module, configured to perform decoding based on the spliced feature to generate the second body image.

In an implementation, the clothes feature, the skin feature, and the body feature each includes sub-features of at least two scales; and the feature splicing sub-module is configured to separately splice sub-features of same scales in the clothes feature, the skin feature, and the body feature to obtain at least two spliced sub-features; and splice the at least two spliced sub-features to obtain the spliced feature.

In an implementation, the step of obtaining the second clothes image, the feature extraction step, and the step of generating the second body image are performed by the image fusion model.

In an implementation, the apparatus further includes:

a second obtaining module, configured to obtain a first initial model and a second initial model, the first initial model and the second initial model having a same structure;

a third obtaining module, configured to obtain a first sample body image including a first body, a first sample clothes image including first clothes, and a second sample clothes image including second clothes, the first body in the first sample body image wearing the first clothes;

a second generation module, configured to perform image fusion on the first sample body image and the second sample clothes image by using the first initial model to generate a second sample body image, the first body in the second sample body image wearing the second clothes;

a third generation module, configured to perform image fusion on the second sample body image and the first sample clothes image by using the second initial model to generate a target sample body image, the first body in the target sample body image wearing the first clothes;

a first training module, configured to train the first initial model based on an error between the first sample body image and the second sample body image and an error between the first sample body image and the target sample body image;

a second training module, configured to train the second initial model based on an error between the second sample body image and the target sample body image and the error between the first sample body image and the target sample body image; and a fourth obtaining module, configured to: in response to that both the first initial model and the second initial model meet a model training condition, obtain a trained second initial model as the image fusion model.

In an implementation, the first training module is configured to determine a first error based on a difference in pixel value distribution between the first sample body image and the second sample body image; determine an error between a pixel value matrix corresponding to the first sample body image and a pixel value matrix corresponding to the second sample body image as a second error; determine an error between the pixel value matrix corresponding to the first sample body image and a pixel value matrix corresponding to the target sample body image as a third error; determine an error between an image feature of a clothes area in the first sample body image and an image feature of a clothes area in the target sample body image as a fourth error; and adjust a model parameter of the first initial model based on the first error, the second error, the third error, and the fourth error.

In an implementation, the first training module is further configured to backpropagate the first error, the second error, the third error, and the fourth error to the first initial model, to solve a parameter at each operation layer in the first initial model; and adjust the parameter at each operation layer in the first initial model based on a solution result.

In an implementation, the second training module is configured to determine a fifth error based on a difference in pixel value distribution between the second sample body image and the target sample body image; determine an error between a pixel value matrix corresponding to the second sample body image and a pixel value matrix corresponding to the target sample body image as a sixth error; determine an error between a pixel value matrix corresponding to the first sample body image and the pixel value matrix corresponding to the target sample body image as a seventh error; determine an error between an image feature of a clothes area in the first sample body image and an image feature of a clothes area in the target sample body image as an eighth error; and adjust a model parameter of the second initial model based on the fifth error, the sixth error, the seventh error, and the eighth error.

In the apparatus provided in this embodiment of this disclosure, the original first clothes image is first transformed based on the posture of the target body to obtain the second clothes image that fits the posture of the target body and that preserves a large amount of detailed information; and then feature extraction is performed on the second clothes image and the first body image in different dimensions based on different extraction tasks to obtain the clothes feature, the skin feature, and the body feature, that is, to obtain three more fine-grained and more accurate features in different dimensions, so that the second body image generated based on these features can include more abundant detailed information, the second body image has high authenticity, and a good virtual dressing effect is ensured.

It should be noted that: When the image generation apparatus generates images, the foregoing embodiment is merely described by using an example of dividing various functional modules. In actual application, the foregoing function allocation is completed by different functional modules according to needs, that is, the internal structure of the apparatus is divided into different functional modules, to complete all or some of functions described above. In addition, the image generation apparatus and the image generation method embodiments provided in the foregoing embodiments belong to one conception. For a specific implementation process, refer to the method embodiments.

Figure 12:
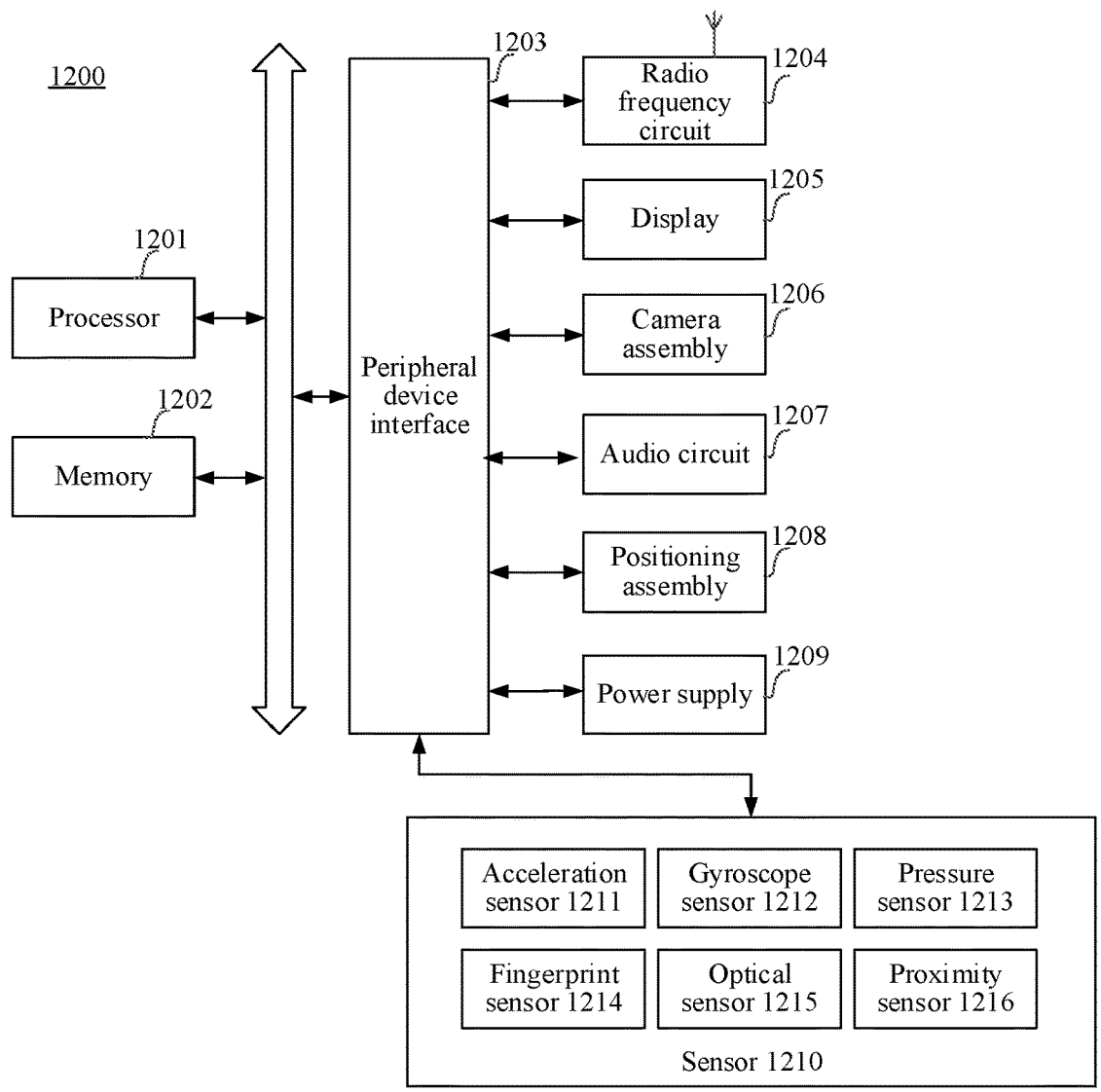
FIG. 12 is a schematic structural diagram of a terminal according to an embodiment of this disclosure.

The computer device provided in the foregoing technical solution may be implemented as a terminal or a server. For example, FIG. 12 is a schematic structural diagram of a terminal according to an embodiment of this disclosure. The terminal 1200 may be: a smartphone, a tablet computer, a moving picture experts group audio layer III (MP3) player, a moving picture experts group audio layer IV (MP4) player, a notebook computer, or a desktop computer. The terminal 1200 may also be referred to by other names as user equipment, a portable terminal, a laptop terminal, a desktop terminal, etc.

Generally, the terminal 1200 includes: one or more processors 1201 and one or more memories 1202. The processor 1201 may include one or more processing cores, such as a 4-core processor or an 8-core processor. The processor 1201 may be implemented by at least one hardware form in a digital signal processing (DSP), a field-programmable gate array (FPGA), and a programmable logic array (PLA).

The memory 1202 may include one or more computer-readable storage media. The computer-readable storage media may be non-transitory. The memory 1202 may also include a high-speed random access memory, as well as non-transitory memory, such as one or more disk storage devices and flash storage devices. In some embodiments, the non-transient computer-readable storage medium in the memory 1202 is configured to store at least one computer-readable instruction, and the at least one computer-readable instruction is configured to be executed by the processor 1201 to implement the image generation method provided in the method embodiments of this disclosure.

In some embodiments, the terminal 1200 may include: a peripheral interface 1203 and at least one peripheral device. The processor 1201, the memory 1202, and the peripheral device interface 1203 may be connected by using a bus or a signal cable. Each peripheral may be connected to the peripheral interface 1203 by using a bus, a signal cable, or a circuit board. Specifically, the peripheral device includes: at least one of a radio frequency circuit 1204, a display screen 1205, a camera assembly 1206, an audio circuit 1207, a positioning assembly 1208, and a power supply 1209.

The peripheral device interface 1203 may be configured to connect at least one peripheral device related to input/output (I/O) to the processor 1201 and the memory 1202. In some embodiments, the processor 1201, the memory 1202, and the peripheral interface 1203 are integrated on the same chip or the same circuit board. In some other embodiments, any one or two of the processor 1201, the memory 1202, and the peripheral device interface 1203 may be implemented on a separate chip or circuit board, which is not limited in this embodiment.

The RF circuit 1204 is configured to receive and transmit an RF signal, also referred to as an electromagnetic signal. The RF circuit 1204 communicates with a communication network and another communication device by using the electromagnetic signal. The display screen 1205 is configured to display a user interface (UI). The UI may include a graph, a text, an icon, a video, and any combination thereof. The camera assembly 1206 is configured to capture images or videos. The audio frequency circuit 1207 may include at least one of a microphone and a speaker. The positioning assembly 1208 is configured to obtain a current location of the positioning terminal 1200. The power supply 1209 is configured to supply power to components in the terminal 1200.

In some embodiments, the terminal 1200 further includes one or more sensors 1210. The one or more sensors 1210 include but are not limited to: an acceleration sensor 1211, a gyro sensor 1212, a pressure sensor 1213, a fingerprint sensor 1214, an optical sensor 1215, and a proximity sensor 1216.

A person skilled in the art can understand that the structure shown in FIG. 12 does not constitute a limitation to the terminal 1200, and the terminal may include more or fewer components than those shown in the figure, or some components may be combined, or a different component arrangement may be used.

Figure 13:
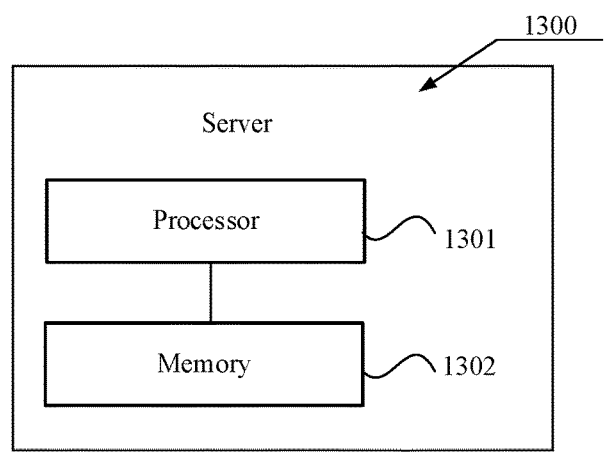
FIG. 13 is a schematic structural diagram of a server according to an embodiment of this disclosure.

FIG. 13 is a schematic structural diagram of a server according to an embodiment of this disclosure. The server 1300 may vary greatly because a configuration or performance varies, and may include one or more central processing units (CPU) 1301 and one or more memories 1302. The one or more memories 1302 store at least one piece of computer-readable instruction, and the at least one piece of computer-readable instruction is loaded and executed by the one or more processors 1301 to implement the methods provided in the foregoing various method embodiments. Certainly, the server 1300 may further include components such as a wired or wireless network interface, a keyboard, and an input/output interface, to facilitate inputs/outputs. The server 1300 may further include another component configured to implement functions of a device.

In an exemplary embodiment, one or more non-transitory computer-readable storage media storing computer-readable instructions are also provided, for example, including a memory including at least one piece of computer-readable instruction. The foregoing at least one computer-readable instruction may be executed by a processor to implement the image generation method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program product is provided. The computer program product includes at least one piece of computer-readable instruction, and the at least one piece of computer-readable instructions are stored in a computer-readable storage medium. The processor of the computer device reads the at least one piece of computer-readable instruction from the computer-readable storage medium, and the processor executes the at least one piece of computer-readable instruction, to cause the computer device to perform the steps in the image generation method.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. An image generation method, performed by a computer device, the method comprising:
   obtaining a first body image comprising a target body and a first clothes image comprising target clothes;
   transforming the first clothes image based on a posture of the target body in the first body image to obtain a second clothes image, the second clothes image comprising the target clothes, and a posture of the target clothes matching the posture of the target body;
   performing feature extraction on the second clothes image, an image of a bare area in the first body image, and the first body image to obtain a clothes feature, a skin feature, and a body feature respectively, the bare area being an area, of the target body in the first body image, that is not covered by clothes; and
   generating a second body image based on the clothes feature, the skin feature, and the body feature, the target body in the second body image wearing the target clothes.

2. The method according to claim 1, wherein the transforming the first clothes image based on the posture of the target body in the first body image to obtain the second clothes image comprises:
   determining a first area image based on the posture of the target body in the first body image and the first clothes image, the first area image indicating an area of the target body covered by the target clothes; and
   transforming, based on the first area image, the first clothes image to obtain the second clothes image.

3. The method according to claim 2, wherein the determining the first area image based on the posture of the target body in the first body image and the first clothes image comprises:
   performing body area recognition on the first body image, and setting pixels belonging to a same body area in the first body image to a same pixel value to obtain a body semantic image, the body semantic image indicating the posture of the target body; and
   determining the first area image based on the body semantic image and the first clothes image.

4. The method according to claim 3, wherein the determining the first area image based on the body semantic image and the first clothes image comprises:
   inputting the body semantic image and the first clothes image to a clothes area prediction network of an image fusion model;
   extracting, with the clothes area prediction network, a body posture feature corresponding to the body semantic image and a contour feature of the target clothes in the first clothes image; and
   determining the first area image based on the body posture feature and the contour feature of the target clothes.

5. The method according to claim 2, wherein the transforming the first clothes image to obtain the second clothes image comprises:
   inputting the first area image and the first clothes image to a spatial transformer network of an image fusion model, the spatial transformer network being configured to transform an image;
   transforming, with the spatial transformer network, the first clothes image based on a mapping relationship between the first clothes image and a first mask area to obtain an intermediate clothes image, the first mask area indicating an area in which the target clothes are located in the first clothes image;

determining, with the spatial transformer network, a texture feature corresponding to the intermediate clothes image; and generating the second clothes image based on the texture feature and the intermediate clothes image.

6. The method according to claim 5, wherein the transforming the first clothes image to obtain the intermediate clothes image comprises:

determining an initial contour of the target clothes based on the first mask area, and determining, based on the first area image, a target contour corresponding to the target clothes after the transformation;

determining a mapping relationship between the initial contour and the target contour based on the initial contour and the target contour; and transforming the first clothes image based on the mapping relationship to obtain the intermediate clothes image.

7. The method according to claim 5, wherein the spatial transformer network comprises a clothes generation sub-network, and the determining the texture feature corresponding to the intermediate clothes image comprises:

performing, based on the clothes generation sub-network and a pre-learned clothes detail feature, feature extraction on the intermediate clothes image to obtain the texture feature corresponding to the intermediate clothes image.

8. The method according to claim 1, wherein the performing the feature extraction on the second clothes image, the image of the bare area in the first body image, and the first body image to obtain the clothes feature, the skin feature, and the body feature respectively comprises:

performing, with a clothes coding network of an image fusion model, feature extraction on the second clothes image to obtain the clothes feature;

performing, with a skin coding network of the image fusion model, feature extraction on the image of the bare area in the first body image to obtain the skin feature; and performing, with a portrait coding network of the image fusion model, feature extraction on the first body image to obtain the body feature.

9. The method according to claim 1, wherein the generating a second body image based on the clothes feature, the skin feature, and the body feature comprises:

splicing the clothes feature, the skin feature, and the body feature to obtain a spliced feature; and decoding the spliced feature to generate the second body image.

10. The method according to claim 9, wherein the clothes feature, the skin feature, and the body feature each comprises sub-features having at least two different scales, and the splicing the clothes feature, the skin feature, and the body feature to obtain a spliced feature comprises:

separately splicing sub-features with same scales in the clothes feature, the skin feature, and the body feature to obtain at least two spliced sub-features; and splicing the at least two spliced sub-features to obtain the spliced feature.

11. The method according to claim 1, wherein the step of obtaining the second clothes image, the feature extraction step, and the step of generating the second body image are performed by an image fusion model.

12. An image generation apparatus, comprising:

a memory operable to store computer-readable instructions; and a processor circuitry operable to read the computer-readable instructions, the processor circuitry when executing the computer-readable instructions is configured to:

obtain a first body image comprising a target body and a first clothes image comprising target clothes;

transform the first clothes image based on a posture of the target body in the first body image to obtain a second clothes image, the second clothes image comprising the target clothes, and a posture of the target clothes matching the posture of the target body;

perform feature extraction on the second clothes image, an image of a bare area in the first body image, and the first body image to obtain a clothes feature, a skin feature, and a body feature respectively, the bare area being an area, of the target body in the first body image, that is not covered by clothes; and generate a second body image based on the clothes feature, the skin feature, and the body feature, the target body in the second body image wearing the target clothes.

13. The apparatus according to claim 12, wherein the processor circuitry is configured to:

determine a first area image based on the posture of the target body in the first body image and the first clothes image, the first area image indicating an area of the target body covered by the target clothes; and transform, based on the first area image, the first clothes image to obtain the second clothes image.

14. The apparatus according to claim 13, wherein the processor circuitry is configured to:

perform body area recognition on the first body image, and set pixels belonging to a same body area in the first body image to a same pixel value to obtain a body semantic image, the body semantic image indicating the posture of the target body; and determine the first area image based on the body semantic image and the first clothes image.

15. The apparatus according to claim 14, wherein the processor circuitry is configured to:

input the body semantic image and the first clothes image to a clothes area prediction network of an image fusion model;

extract, with the clothes area prediction network, a body posture feature corresponding to the body semantic image and a contour feature of the target clothes in the first clothes image; and determine the first area image based on the body posture feature and the contour feature of the target clothes.

16. The apparatus according to claim 13, wherein the processor circuitry is configured to:

input the first area image and the first clothes image to a spatial transformer network of an image fusion model, the spatial transformer network being configured to transform an image;

transform, with the spatial transformer network, the first clothes image based on a mapping relationship between the first clothes image and a first mask area to obtain an intermediate clothes image, the first mask area indicating an area in which the target clothes are located in the first clothes image;

determine, with the spatial transformer network, a texture feature corresponding to the intermediate clothes image; and
generate the second clothes image based on the texture feature and the intermediate clothes image.

17. The apparatus according to claim 16, wherein the processor circuitry is configured to:
determine an initial contour of the target clothes based on the first mask area, and determine, based on the first area image, a target contour corresponding to the target clothes after the transformation;
determine a mapping relationship between the initial contour and the target contour based on the initial contour and the target contour; and
transform the first clothes image based on the mapping relationship to obtain the intermediate clothes image.

18. The apparatus according to claim 12, the processor circuitry is configured to:
perform, with a clothes coding network of an image fusion model, feature extraction on the second clothes image to obtain the clothes feature;
perform, with a skin coding network of the image fusion model, feature extraction on the image of the bare area in the first body image to obtain the skin feature; and
perform, with a portrait coding network of the image fusion model, feature extraction on the first body image to obtain the body feature.

19. The apparatus of claim 12, wherein the processor circuitry is configured to:
splice the clothes feature, the skin feature, and the body feature to obtain a spliced feature; and
decode the spliced feature to generate the second body image.

20. A non-transitory machine-readable media, having instructions stored on the machine-readable media, the instructions configured to, when executed, cause a machine to:
obtain a first body image comprising a target body and a first clothes image comprising target clothes;
transform the first clothes image based on a posture of the target body in the first body image to obtain a second clothes image, the second clothes image comprising the target clothes, and a posture of the target clothes matching the posture of the target body;
perform feature extraction on the second clothes image, an image of a bare area in the first body image, and the first body image to obtain a clothes feature, a skin feature, and a body feature respectively, the bare area being an area, of the target body in the first body image, that is not covered by clothes; and
generate a second body image based on the clothes feature, the skin feature, and the body feature, the target body in the second body image wearing the target clothes.

* * * * *